United States Patent
Yoshida et al.

(10) Patent No.: US 8,522,534 B2
(45) Date of Patent: Sep. 3, 2013

(54) EXHAUST PURIFICATION DEVICE OF INTERNAL COMBUSTION ENGINE

(75) Inventors: Kohei Yoshida, Gotenba (JP);
Takamitsu Asanuma, Mishima (JP);
Nobumoto Ohashi, Susono (JP); Yuichi Sobue, Susono (JP); Kazunobu Ishibashi, Toyota (JP); Nobuyuki Takagi, Toyota (JP); Masao Watanabe, Susono (JP); Masamichi Kuwajima, Toyota (JP); Takayuki Endo, Kakegawa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 282 days.

(21) Appl. No.: 12/863,798

(22) PCT Filed: Apr. 13, 2009

(86) PCT No.: PCT/JP2009/057806
§ 371 (c)(1), (2), (4) Date: Jul. 21, 2010

(87) PCT Pub. No.: WO2009/131080
PCT Pub. Date: Oct. 29, 2009

(65) Prior Publication Data
US 2010/0287914 A1    Nov. 18, 2010

(30) Foreign Application Priority Data

Apr. 22, 2008 (JP) ................................. 2008-111433

(51) Int. Cl.
*F01N 3/08* (2006.01)
*F01N 3/24* (2006.01)
*F01N 3/28* (2006.01)
*F01N 3/36* (2006.01)
*B01D 53/94* (2006.01)

(52) U.S. Cl.
USPC ................................. 60/295; 60/286; 60/301

(58) Field of Classification Search
USPC ..................................................... 60/286, 295
See application file for complete search history.

(56) References Cited

U.S. PATENT DOCUMENTS

| | | | | |
|---|---|---|---|---|
| 6,018,943 A * | 2/2000 | Martin et al. | ................... | 60/274 |
| 6,311,480 B1 * | 11/2001 | Suzuki et al. | ................... | 60/276 |
| 6,988,360 B2 * | 1/2006 | Kimura et al. | ................. | 60/286 |
| 7,127,883 B1 * | 10/2006 | Kaneko et al. | ................. | 60/295 |
| 7,730,719 B2 * | 6/2010 | Yoshida | ........................ | 60/286 |

(Continued)

FOREIGN PATENT DOCUMENTS

| | | |
|---|---|---|
| JP | 11 81992 | 3/1999 |
| JP | 2000 345832 | 12/2000 |

(Continued)

*Primary Examiner* — Kenneth Bomberg
*Assistant Examiner* — Dapinder Singh
(74) *Attorney, Agent, or Firm* — Oblon, Spivak, McClelland, Maier & Neustadt, L.L.P.

(57) ABSTRACT

An internal combustion engine in an engine exhaust passage of which an $NO_x$ adsorption catalyst (12) adsorbing $NO_x$ contained in exhaust gas at the time of a low temperature and desorbing the adsorbed $NO_x$ when the temperature rises and an $NO_x$ storage catalyst (14) are arranged. When the $NO_x$ storage catalyst (14) can store $NO_x$, the temperature of the $NO_x$ adsorption catalyst (12) is made to forcibly rise to a target temperature at which the amount of $NO_x$ which the $NO_x$ storage catalyst (14) can store is desorbed, and the $NO_x$ desorbed from the $NO_x$ adsorption catalyst (12) is stored in the $NO_x$ storage catalyst (14).

8 Claims, 7 Drawing Sheets

(56) References Cited

U.S. PATENT DOCUMENTS

| | | |
|---|---|---|
| 2001/0032457 A1* | 10/2001 | Ludwig et al. ............... 60/285 |
| 2003/0182933 A1 | 10/2003 | Adelman et al. |
| 2006/0153761 A1* | 7/2006 | Bandl-Konrad et al. .. 423/239.1 |
| 2009/0071125 A1* | 3/2009 | Yoshida .......................... 60/286 |

FOREIGN PATENT DOCUMENTS

| | | |
|---|---|---|
| JP | 2002 349247 | 12/2002 |
| JP | 2006 509137 | 3/2006 |
| JP | 2007 245050 | 9/2007 |
| WO | WO2006/109889 | * 10/2006 |

* cited by examiner

EXHAUST PURIFICATION DEVICE OF INTERNAL COMBUSTION ENGINE

TECHNICAL FIELD

The present invention relates to an exhaust purification device of an internal combustion engine.

BACKGROUND ART

Known in the art is an internal combustion engine arranging in an engine exhaust passage an $NO_x$ storage catalyst storing $NO_x$ contained in exhaust gas when the air-fuel ratio of the inflowing exhaust gas is lean and releasing the stored $NO_x$ when the air-fuel ratio of the inflowing exhaust gas becomes a stoichiometric air-fuel ratio or rich. In this internal combustion engine, the $NO_x$ produced at the time of combustion under a lean air-fuel ratio is stored in the $NO_x$ storage catalyst to thereby prevent the $NO_x$ from being exhausted into the atmosphere.

However, the $NO_x$ storage ability of this $NO_x$ storage catalyst falls the lower the temperature of the $NO_x$ storage catalyst. Therefore, when the temperature of the $NO_x$ storage catalyst is low, the $NO_x$ ends up being exhausted into the atmosphere. Accordingly, there is known an internal combustion engine arranging in an engine exhaust passage upstream of the $NO_x$ storage catalyst an $NO_x$ adsorption catalyst adsorbing the $NO_x$ contained in the exhaust gas at the time of a low temperature and desorbing the adsorbed $NO_x$ when the temperature rises (for example, see Patent Literature 1).

In this internal combustion engine, when the temperature of the $NO_x$ adsorption catalyst is low such as for example at the time of engine startup, the $NO_x$ exhausted from the engine is adsorbed at the $NO_x$ adsorption catalyst. When the temperature of $NO_x$ adsorption catalyst rises, the $NO_x$ is desorbed from the $NO_x$ adsorption catalyst and the desorbed $NO_x$ is stored in the $NO_x$ storage catalyst.

CITATION LIST

Patent Literature

Patent Literature 1: Japanese Patent Publication (A) No. 2007-245050

SUMMARY OF INVENTION

Technical Problem

However, if leaving the action of desorption of $NO_x$ from the $NO_x$ adsorption catalyst to the circumstances in this way, for example, when the temperature of the $NO_x$ adsorption catalyst will not easily rise, the $NO_x$ adsorption catalyst will end up becoming saturated in its $NO_x$ adsorption ability and therefore the problem will arise of the $NO_x$ in the exhaust gas no longer being able to be adsorbed at the $NO_x$ adsorption catalyst.

An object of the present invention is to provide an exhaust purification device of an internal combustion engine able to avoid saturation of the $NO_x$ adsorption ability of an $NO_x$ adsorption catalyst.

Solution to Problem

According to the present invention, there is provided an exhaust purification device of an internal combustion engine arranging in an engine exhaust passage an $NO_x$ storage catalyst storing $NO_x$ contained in an exhaust gas when an air-fuel ratio of an inflowing exhaust gas is lean and releasing stored $NO_x$ when the air-fuel ratio of the inflowing exhaust gas becomes the stoichiometric air-fuel ratio or rich and arranging upstream of the $NO_x$ storage catalyst in the engine exhaust passage an $NO_x$ adsorption catalyst adsorbing $NO_x$ contained in exhaust gas when at a low temperature and desorbing an adsorbed $NO_x$ when a temperature rises, wherein when the $NO_x$ storage catalyst is able to store $NO_x$, a temperature of the $NO_x$ adsorption catalyst is forcibly made to rise to a target temperature at which an amount of $NO_x$ which the $NO_x$ storage catalyst can store is desorbed, and the $NO_x$ desorbed from the $NO_x$ adsorption catalyst is made to be stored in the $NO_x$ storage catalyst.

Advantageous Effects of Invention

The temperature of the $NO_x$ adsorption catalyst is forcibly raised and $NO_x$ is made to desorb from the $NO_x$ adsorption catalyst, so saturation of the $NO_x$ adsorption ability of the $NO_x$ adsorption catalyst can be avoided.

DESCRIPTION OF EMBODIMENTS

Figure 1:
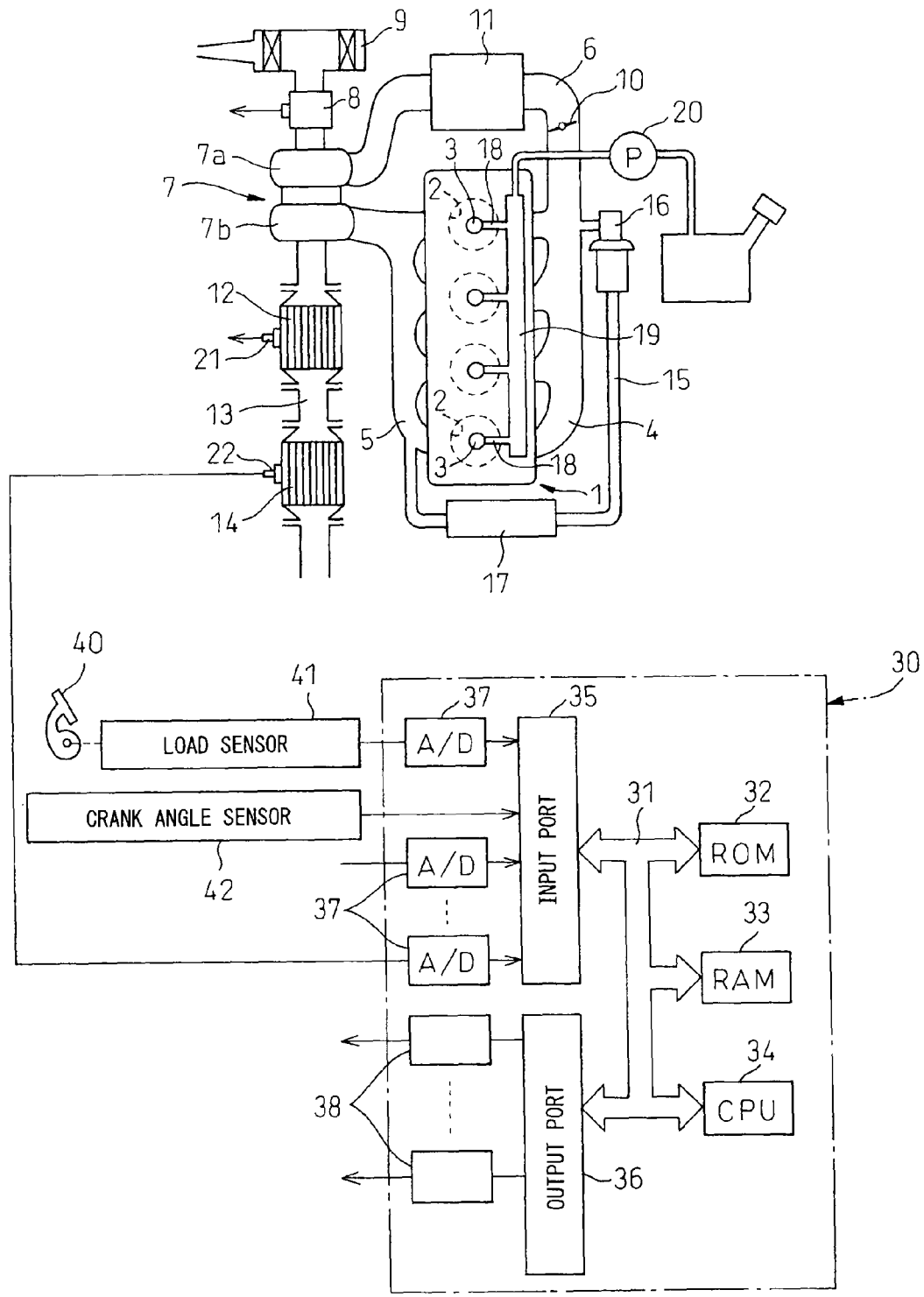
FIG. 1 is an overview of a compression ignition type internal combustion engine.

FIG. 1 shows an overview of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to the outlet of a compressor 7a of an exhaust turbocharger 7. The inlet of the compressor 7a is connected to an air cleaner 9 via an intake air amount detector 8. Inside the intake duct 6 is arranged a throttle valve 10 driven by a step motor. Further, around the intake duct 6 is arranged a cooling device 11 for cooling the intake air flowing through the inside of the intake duct 6. In the embodiment shown in FIG. 1, the engine cooling water is guided into the cooling device 11. The engine cooling water cools the intake air. On the other hand, the exhaust manifold 5 is connected to the inlet of an exhaust turbine 7b of the exhaust turbocharger 7, while the outlet of the exhaust turbine 7b is connected to the inlet of an $NO_x$ adsorption catalyst 12. Further, the outlet of the $NO_x$ adsorption catalyst 12 is connected through an exhaust pipe 13 to an NOx storage catalyst 14.

The exhaust manifold 5 and the intake manifold 4 are interconnected through an exhaust gas recirculation (hereinafter referred to as an "EGR") passage 15. The EGR passage 15 is provided with an electronically controlled EGR control valve 16. Further, around the EGR passage 15 is arranged a cooling device 17 for cooling the EGR gas flowing through the inside of the EGR passage 15. In the embodiment shown in FIG. 1, the engine cooling water is guided into the cooling device 17. The engine cooling water cools the EGR gas. On the other hand, each fuel injector 3 is connected through a fuel feed tube 18 to a common rail 19. This common rail 19 is supplied with fuel from an electronically controlled variable discharge fuel pump 20. The fuel supplied into the common rail 19 is supplied through each fuel feed tube 18 to the fuel injector 3.

An electronic control unit 30 is comprised of a digital computer provided with a read only memory (ROM) 32, a random access memory (RAM) 33, a microprocessor (CPU) 34, an input port 35, and an output port 36 all connected to each other by a bidirectional bus 31. The $NO_x$ adsorption catalyst 12 is provided with a temperature sensor 21 for detecting the temperature of the $NO_x$ adsorption catalyst 12. The $NO_x$ storage catalyst 14 is provided with a temperature sensor 22 for detecting the temperature of the $NO_x$ storage catalyst 14. The output signals of the temperature sensors 21 and 22 and the intake air amount detector 8 are input through corresponding AD converters 37 to the input port 35.

An accelerator pedal 40 has a load sensor 41 generating an output voltage proportional to the amount of depression L of the accelerator pedal 40 connected to it. The output voltage of the load sensor 41 is input through a corresponding AD converter 37 to the input port 35. Further, the input port 35 has a crank angle sensor 42 generating an output pulse each time the crankshaft turns for example by 15 degrees connected to it. On the other hand, the output port 36 is connected through corresponding drive circuits 38 to the fuel injectors 3, step motor for driving throttle valve 10 EGR control valve 16, and fuel pump 20.

Figure 2:
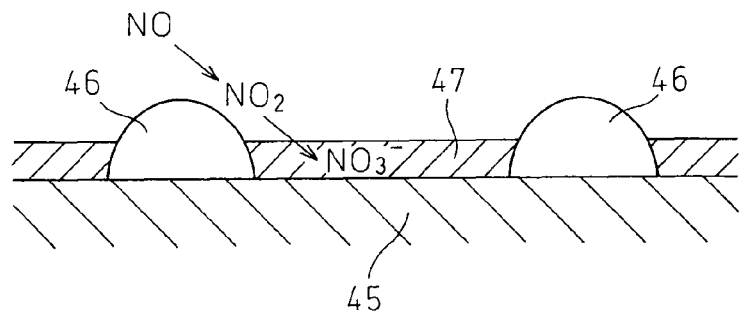
FIG. 2 is a cross-sectional view of a surface part of a catalyst carrier of an $NO_x$ storage catalyst.

First, explaining the $NO_x$ storage catalyst 14 shown in FIG. 1, a catalyst carrier 45 comprised of for example alumina is carried on the substrate of the $NO_x$ storage catalyst 14. FIG. 2 schematically shows the cross-section of the surface part of this catalyst carrier 45. As shown in FIG. 2 the catalyst carrier 45 carries a precious metal catalyst 46 diffused on its surface. Further, the catalyst carrier 45 is formed with a layer of an $NO_x$ absorbent 47 on its surface.

In this embodiment of the present invention, platinum Pt is used as the precious metal catalyst 46. As the ingredient forming the $NO_x$ absorbent 47, for example, at least one element selected from potassium K, sodium Na, cesium Cs, or another alkali metal, barium Ba, calcium Ca, or another alkali earth, lanthanum La, yttrium Y, or another rare earth may be used.

If the ratio of the air and fuel (hydrocarbons) supplied to the engine intake passage, combustion chambers 2, and exhaust passage upstream of the $NO_x$ storage catalyst 14 is referred to as the "air-fuel ratio of the exhaust gas", the $NO_x$ absorbent 47 performs an $NO_x$ absorption and release action of storing the $NO_x$ when the air-fuel ratio of the exhaust gas is lean and releasing the stored $NO_x$ when the oxygen concentration in the exhaust gas falls.

That is, if explaining this taking as an example the case of using barium Ba as the ingredient forming the $NO_x$ absorbent 47, when the air-fuel ratio of the exhaust gas is lean, that is, when the oxygen concentration in the exhaust gas is high, the NO contained in the exhaust gas is oxidized on the platinum Pt 46 such as shown in FIG. 2 to become $NO_2$, then is absorbed in the $NO_x$ absorbent 47 and diffuses in the $NO_x$ absorbent 47 in the form of nitric acid ions $NO_3^-$ while bonding with the barium oxide BaO. In this way, the $NO_x$ is absorbed in the $NO_x$ absorbent 47. So long as the oxygen concentration in the exhaust gas is high, $NO_2$ is produced on the surface of the platinum Pt 46. So long as the $NO_x$ absorbing capability of the $NO_x$ absorbent 47 is not saturated, the $NO_2$ is absorbed in the $NO_x$ absorbent 47 and nitric acid ions $NO_3^-$ are produced.

As opposed to this, if the air-fuel ratio of the exhaust gas is made rich or the stoichiometric air-fuel ratio, since the oxygen concentration in the exhaust gas falls, the reaction proceeds in the reverse direction ($NO_3^- \rightarrow NO_2$) and therefore the nitric acid ions $NO_3^-$ in the $NO_x$ absorbent 47 are released from the $NO_x$ absorbent 47 in the form of $NO_2$. Next, the released $NO_x$ is reduced by the unburned hydrocarbons or CO included in the exhaust gas.

In this way, when the air-fuel ratio of the exhaust gas is lean, that is, when burning fuel under a lean air-fuel ratio, the $NO_x$ in the exhaust gas is absorbed in the $NO_x$ absorbent 47. However, if continuing to burn fuel under a lean air-fuel ratio, during that time the $NO_x$ absorbing capability of the $NO_x$ absorbent 47 will end up becoming saturated and therefore $NO_x$ will end up no longer being able to be absorbed by the $NO_x$ absorbent 47. Therefore, in this embodiment according to the present invention, before the absorbing capability of the $NO_x$ absorbent 47 becomes saturated, the air-fuel ratio of the exhaust gas is temporarily made rich and thereby release the $NO_x$ from the $NO_x$ absorbent 47.

Now then, as explained above, when combustion is performed under a lean air-fuel ratio, the $NO_x$ in the exhaust gas is absorbed in the $NO_x$ absorbent 47. In other words, when combustion is performed under a lean air-fuel ratio, the $NO_x$ in the exhaust gas is stored in the NO storage catalyst 14. However, in this case, the $NO_x$ storage rate showing the ratio of the amount of $NO_x$ stored in the $NO_x$ storage catalyst 14 to the amount of $NO_x$ in the exhaust gas changes in accordance with the temperature of the $NO_x$ storage catalyst 14. The change in this $NO_x$ storage rate RB with respect to the temperature TC of the $NO_x$ storage catalyst 14 is shown in FIG. 3.

Figure 3:
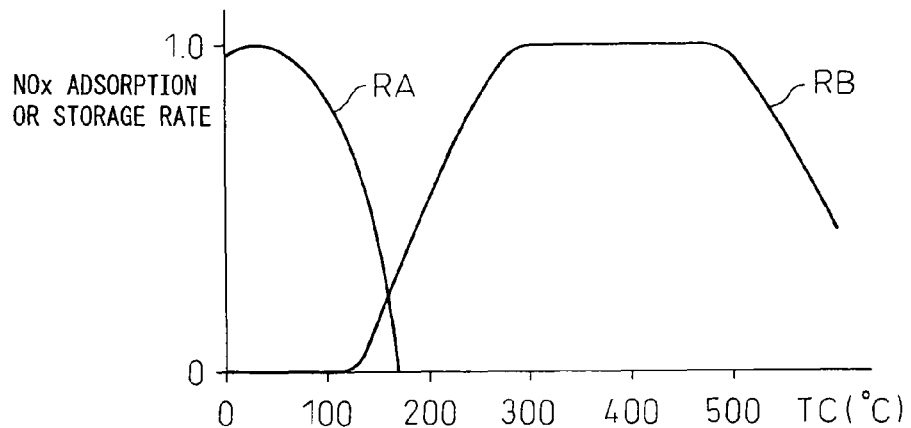
FIG. 3 is a view showing an $NO_x$ adsorption rate and $NO_x$ storage rate.

In the example shown in FIG. 3, the $NO_x$ storage rate RB peaks when the temperature TC of the $NO_x$ storage catalyst 14 is about 300° C. to about 500° C. in range. As opposed to this, if the temperature TC of the $NO_x$ storage catalyst 14 falls, the oxidizing power of the precious metal 46 against NO falls along with this, so the $NO_x$ storage rate RB falls the lower the temperature TC of the $NO_x$ storage catalyst 14 becomes. In the example shown in FIG. 3, the $NO_x$ storage rate RB is made to fall if the temperature TC of the $NO_x$ storage catalyst 14 becomes about 300° C. or less. This $NO_x$ storage rate RB becomes zero when the temperature TC of the $NO_x$ storage catalyst 14 becomes about 130° C.

The $NO_x$ storage rate RB shown in FIG. 3 is one example. Depending on the type of the $NO_x$ storage catalyst 14, there are also $NO_x$ storage catalysts where the peak of the $NO_x$ storage rate RB extends to a further lower temperature. However, no matter what kind of $NO_x$ storage catalyst 14 is used, if the temperature TC of the $NO_x$ storage catalyst 14 becomes low, the $NO_x$ storage rate RB will fall and the $NO_x$ contained in the exhaust gas will no longer be able to be sufficiently stored.

Therefore, in the present invention, upstream of the $NO_x$ storage catalyst 14 in the engine exhaust passage, an $NO_x$ adsorption catalyst 12 adsorbing $NO_x$ contained in the exhaust gas when at a low temperature and desorbing the adsorbed $NO_x$ when the temperature rises is arranged. This $NO_x$ adsorption catalyst 12 is formed from a material containing for example cerium Ce which can sufficiently adsorb $NO_x$ even at room temperature, that is, 15° C. to 25° C. or so. In this $NO_x$ adsorption catalyst 12 as well, the $NO_x$ adsorption rate showing the ratio of the amount of $NO_x$ adsorbed at the $NO_x$ adsorption catalyst 12 to the amount of $NO_x$ in the exhaust gas changes in accordance with the temperature of the $NO_x$ adsorption catalyst 12. The change in this $NO_x$ adsorption rate RA with respect to the temperature TC of the $NO_x$ adsorption catalyst 12 is shown in FIG. 3.

In the example shown in FIG. 3, the $NO_x$ adsorption rate RA peaks when the temperature TC of the $NO_x$ adsorption catalyst 12 is at room temperature, that is, is 15° C. to 25° C. or so. The $NO_x$ adsorption rate RA is reduced as the temperature TC of the $NO_x$ adsorption catalyst 12 becomes higher. In the example shown in FIG. 3, when the temperature TC of the $NO_x$ adsorption catalyst 12 rises to about 170° C., the $NO_x$ adsorption rate RA becomes zero. From FIG. 3, it is learned that when the temperature TC of the $NO_x$ adsorption catalyst 12 is low, the $NO_x$ adsorption rate RA is high and, therefore, at this time, the $NO_x$ contained in the exhaust gas can be adsorbed well at the $NO_x$ adsorption catalyst 12.

Figure 5:
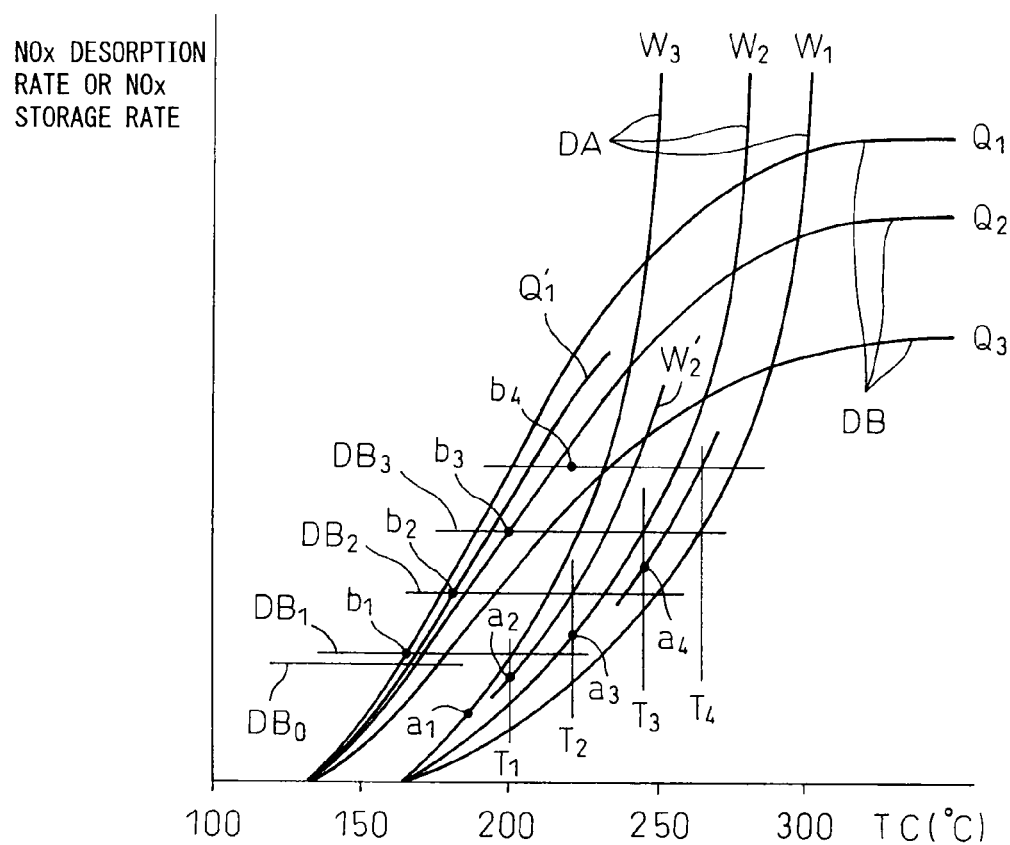
FIG. 5 is a view showing an $NO_x$ desorption rate and $NO_x$ storage rate.

On the other hand, FIG. 5 shows the $NO_x$ desorption rate DA showing the amount of $NO_x$ desorbed from the $NO_x$ adsorption catalyst 12 per unit time as a function of the temperature TC of the $NO_x$ adsorption catalyst 12. Further, it shows the $NO_x$ storage rate DB showing the amount of $NO_x$ stored in the $NO_x$ storage catalyst 14 per unit time as a function of the temperature TC of the $NO_x$ storage catalyst 14. Further, FIG. 5 shows curves showing the $NO_x$ desorption rate DA when the $NO_x$ adsorption amount of the $NO_x$ adsorption catalyst 12 is $W_1$, $N_2$, and $W_3$. In this case, the $NO_x$ adsorption amount becomes greater from $W_1$ toward $W_3$. Further, FIG. 5 shows curves showing the $NO_x$ storage rate DB when the $NO_x$ storage amount of the $NO_x$ storage catalyst 14 is $Q_1$, $Q_2$, and $Q_3$. In this case, the $NO_x$ storage amount becomes greater from $Q_1$ toward $Q_3$.

The $NO_x$ adsorption catalyst 12 performs an $NO_x$ adsorption action and an $NO_x$ desorption action before and after a certain catalyst temperature TC. In this embodiment of the present invention, this catalyst temperature TC is about 170° C. Therefore, as shown in FIG. 3, if the catalyst temperature TC rises to about 170° C., the $NO_x$ adsorption rate RA becomes zero. As shown in FIG. 5, if the catalyst temperature TC becomes higher than 170° C., the $NO_x$ desorption rate DA increases exponentially along with the rise of the catalyst temperature TC. Note that, the greater the $NO_x$ adsorption amount W, the more the desorbed amount of $NO_x$ increases as well, so at the same catalyst temperature TC, the greater the $NO_x$ adsorption amount W, the higher the $NO_x$ desorption rate DA.

On the other hand, the $NO_x$ storage rate DB shown in FIG. 5 changes with respect to the temperature TC of the $NO_x$ storage catalyst 14 in the same way as the $NO_x$ storage rate RB shown in FIG. 3. That is, when the temperature TC of the $NO_x$ storage catalyst 14 becomes about 130° C. or more, the $NO_x$ storage rate DB starts to rise. When the temperature TC of the $NO_x$ storage catalyst 14 rises to about 300° C., the $NO_x$ storage rate DB peaks. Note that, the more the $NO_x$ storage amount Q increases, the harder it is for the $NO_x$ to be stored, so at the same catalyst temperature TC, the more the $NO_x$ storage amount Q increases, the lower the $NO_x$ storage rate DB becomes.

Now then, when, like at the time of engine startup or the time of engine low load operation, the temperature TC of the NOx adsorption catalyst 12 is low, the $NO_x$ adsorption catalyst 12 continues to adsorb $NO_x$. In this case, when the $NO_x$ adsorption catalyst 12 adsorbs a certain extent of $NO_x$, it is preferable to make the $NO_x$ adsorption catalyst 12 desorb the $NO_x$. That is to say, if making it desorb the $NO_x$, when next the temperature TC of the $NO_x$ adsorption catalyst 12 becomes low, it can sufficiently adsorb the $NO_x$. However, in this case, even if desorbing the $NO_x$, if making the $NO_x$ adsorption catalyst 12 desorb the $NO_x$ when the $NO_x$ storage catalyst 14 does not have an $NO_x$ storage ability, this $NO_x$ will end up being released into the atmosphere without being stored at the $NO_x$ storage catalyst 14.

Therefore, in the present invention, when the $NO_x$ storage catalyst 14 can store $NO_x$, the temperature TC of the $NO_x$ adsorption catalyst 12 is forcibly made to rise to the target temperature at which an amount of $NO_x$ which the $NO_x$ storage catalyst 14 can store is desorbed, and the $NO_x$ desorbed from the $NO_x$ adsorption catalyst 12 is made to be stored in the $NO_x$ storage catalyst 14.

However, in this case, if the amount of desorption of $NO_x$ from the $NO_x$ adsorption catalyst 12 is greater than the amount of $NO_x$ which can be stored at the $NO_x$ storage catalyst 14, part of the desorbed $NO_x$ will be released into the atmosphere without being stored at the $NO_x$ storage catalyst 14. In the present invention, to prevent $NO_x$ from being released into the atmosphere in this way, the $NO_x$ adsorption catalyst 12 is made to desorb the $NO_x$ so that the amount of desorption of $NO_x$ from the $NO_x$ adsorption catalyst 12 becomes less than the amount of $NO_x$ which can be stored at the $NO_x$ storage catalyst 14.

That is, in the present invention, the target temperature TO of the $NO_x$ adsorption catalyst 12 to be raised to for making the $NO_x$ adsorption catalyst 12 desorb the $NO_x$ is made the temperature at which the amount of desorption of $NO_x$ from the $NO_x$ adsorption catalyst 12 becomes less than the amount of $NO_x$ able to be stored at the $NO_x$ storage catalyst 14. In other words, in the present invention, the target temperature TO of the $NO_x$ adsorption catalyst 12 to be raised to is made the temperature at which the $NO_x$ desorption rate DA becomes less than the $NO_x$ storage rate DB.

Next, the method of finding this target temperature TO will be explained with reference to FIG. 5. FIG. 5 shows the case of raising the temperature of the $NO_x$ adsorption catalyst 12 to make it desorb the $NO_x$ when the $NO_x$ adsorption amount is $W_3$, the $NO_x$ storage amount is $Q_1$, and the $NO_x$ storage rate DB exceeds the predetermined $NO_x$ storage rate $DB_0$, that is, when the $NO_x$ storage catalyst 14 is in the state shown by the black dot $b_1$ in FIG. 5. In the example shown in FIG. 5, at this time, the $NO_x$ adsorption catalyst 12 is in the state shown by the black dot $a_1$ of FIG. 5. Further, in this example, at this time, the temperature TC of the NOx adsorption catalyst 12 becomes higher than the temperature TC of the $NO_x$ storage catalyst 14.

Now then, the $NO_x$ storage rate DB when the $NO_x$ storage catalyst 14 is in the state shown by the black dot $b_1$ is expressed by the horizontal line $DB_1$ passing through the black dot $b_1$. The catalyst temperature $T_1$ at the intersection of this horizontal line $DB_1$ and the solid line $W_3$ shows the temperature when the $NO_x$ desorption rate DA of the $NO_x$ adsorption catalyst 12 when the $NO_x$ adsorption amount is $W_3$ becomes equal to the $NO_x$ storage rate $DB_1$. That is, when the $NO_x$ storage catalyst 14 is in the state shown by the black dot $b_1$ and the temperature TC of the $NO_x$ adsorption catalyst 12 becomes $T_1$ when the $NO_x$ adsorption amount of the $NO_x$ adsorption catalyst 12 is $W_3$, the $NO_x$ desorption rate DA is no longer equal to the $NO_x$ storage rate $DB_1$. At this time, theoretically, the entire $NO_x$ desorbed from the $NO_x$ adsorption catalyst 12 is adsorbed at the $NO_x$ storage catalyst 14.

In this case, if the temperature TC of the $NO_x$ adsorption catalyst 12 becomes higher than $T_1$, the $NO_x$ desorption rate DA will become higher than even the $NO_x$ storage rate $DB_1$ and the amount of desorbed $NO_x$ will become greater than the amount of adsorbed $NO_x$. Therefore, the temperature TC of the NO$_x$ adsorption catalyst 12 cannot be made higher than T$_1$. As opposed to this, when the temperature TC of the NO$_x$ adsorption catalyst 12 is lower than T$_1$, the NO$_x$ desorption rate DA becomes lower than even the NO$_x$ storage rate DB$_1$ and thus at this time, the desorbed NO$_x$ is reliably stored in the NO$_x$ storage catalyst 14.

Now then, in the example shown in FIG. 5, as explained above, when the NO$_x$ storage catalyst 14 is in the state shown by the black dot b$_1$, the NO$_x$ adsorption catalyst 12 is in the state shown by the black dot a$_1$. At this time, the NO$_x$ desorption rate DA becomes considerably lower than the NO$_x$ storage rate DB$_1$. At this time, if raising the temperature TC of the NO$_x$ adsorption catalyst 12 to close to T$_1$ within a range not exceeding T$_1$, the NO$_x$ desorption rate DA will become higher in a range not exceeding the NO$_x$ storage rate DB$_1$ and thus it will become possible to rapidly desorb NO$_x$ from the NO$_x$ adsorption catalyst 12.

Thus, in the present invention, the temperature TC of the NO$_x$ adsorption catalyst 12 is made to rise toward a temperature somewhat lower than T$_1$. That is, the target temperature TO of the NO$_x$ adsorption catalyst 12 to be raised to is made a temperature somewhat lower than T$_1$. Note that, the temperature raising action of the NO$_x$ adsorption catalyst 12 is for example obtained by delaying the timing of injection of fuel from the fuel injector 3 to raise the exhaust gas temperature or by feeding additional fuel into the combustion chamber at the time of the expansion stroke so as to raise the exhaust gas temperature.

The state of the NO$_x$ adsorption catalyst 12 and the state of the NO$_x$ storage catalyst 14 when a certain time has elapsed from the start of the temperature raising action are respectively shown by the black dots a$_2$ and b$_2$. When a certain time has elapsed from the start of the temperature raising action, as shown in FIG. 5, the temperature TC of the NO$_x$ adsorption catalyst 12 rises to the temperature shown by the black dot a$_2$ and, due to the desorption of NO$_x$, the NO$_x$ adsorption amount falls to W$_2$'. On the other hand, the temperature TC of the NO$_x$ storage catalyst 14 rises to the temperature shown by the black dot b$_2$ and, due to the storage of the desorbed NO$_x$ and NO$_x$ exhausted from the engine, the NO$_x$ storage amount increases to Q$_1$'.

When the NO$_x$ adsorption catalyst 12 and NO$_x$ storage catalyst 14 become the states respectively shown by the black dots a$_2$ and b$_2$, the target temperature TO of the NO$_x$ adsorption catalyst 12 is updated. That is, the catalyst temperature T$_2$ at the intersection between the horizontal line DB$_2$ passing through the black dot b$_2$ and the solid line W$_2$' passing through the black dot a$_2$ is found and a temperature somewhat lower than this catalyst temperature T$_2$ is made the new target temperature TO. When the new target temperature TO is determined, the temperature TC of the NO$_x$ adsorption catalyst 12 is made to rise toward this new target temperature TO. FIG. 5 shows the state of the NO$_x$ adsorption catalyst 12 and the state of the NO$_x$ storage catalyst 14 when a certain time elapses from the start of the temperature raising action toward this new target temperature TO by the black dots a$_3$ and b$_3$.

When the NO$_x$ adsorption catalyst 12 and NO$_x$ storage catalyst 14 become the states shown by the blacks dot a$_3$ and b$_3$, the target temperature TO of the NO$_x$ adsorption catalyst 12 is again updated. That is, the catalyst temperature T$_3$ at the intersection between the horizontal line DB$_3$ passing through the black dot b$_3$ and the solid line W$_2$ passing through the black dot a$_3$ is found and a temperature somewhat lower than this catalyst temperature T$_3$ is made the new target temperature TO. When the new target temperature TO is determined, the temperature TC of the NO$_x$ adsorption catalyst 12 is made to rise toward this new target temperature TO. FIG. 5 shows the state of the NO$_x$ adsorption catalyst 12 and the state of the NO$_x$ storage catalyst 14 when a certain time elapses from the start of the temperature raising action toward this new target temperature TO by the black dots a$_4$ and b$_4$.

When the NO$_x$ adsorption catalyst 12 and NO$_x$ storage catalyst 14 become the states shown by the blacks dot a$_4$ and b$_4$, the target temperature TO of the NO$_x$ adsorption catalyst 12 is again updated and a temperature somewhat lower than the catalyst temperature T$_4$ is made the new target temperature TO. In this way, the target temperature TO is repeatedly updated during the action of desorption of NO$_x$ from the NO$_x$ adsorption catalyst 12 and thereby NO$_x$ is made to quickly be desorbed from the NO$_x$ adsorption catalyst 12.

Note that, in the embodiments of the present invention, the NO$_x$ desorption rate DA from the NO$_x$ adsorption catalyst 12 shown in FIG. 5 is stored as a function of the NO$_x$ adsorption amount W adsorbed at the NO$_x$ adsorption catalyst 12 and the temperature TC of the NO$_x$ adsorption catalyst 12 in advance in the ROM 32, while the NO$_x$ storage rate DB to the NO$_x$ storage catalyst 14 is stored as a function of the NO$_x$ storage amount Q stored in the NO$_x$ storage catalyst 14 and the temperature TC of the NO$_x$ storage catalyst 14 in advance in the ROM 32.

Figure 6:
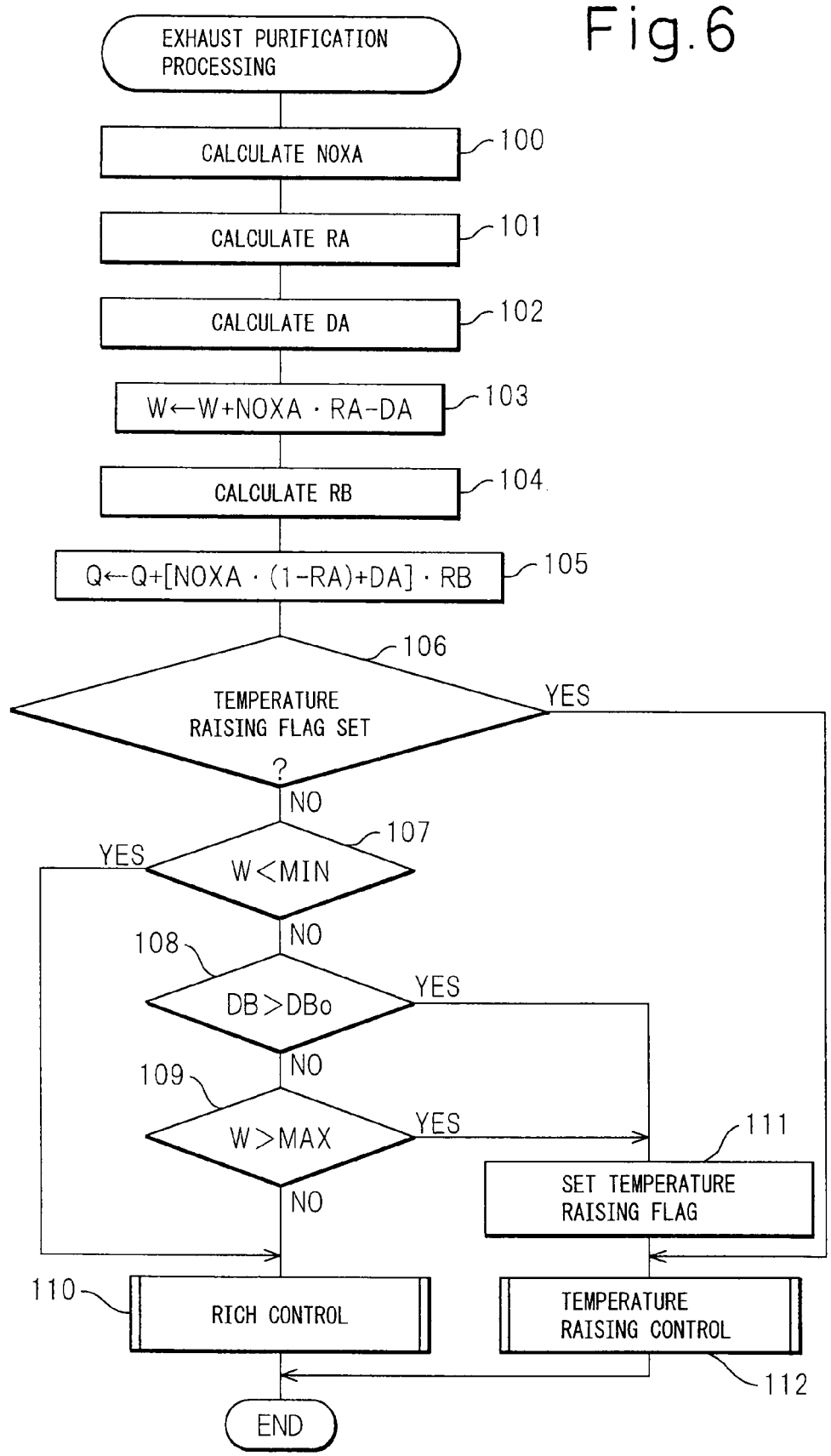
FIG. 6 is a flow chart for exhaust purification processing.
Figure 7:
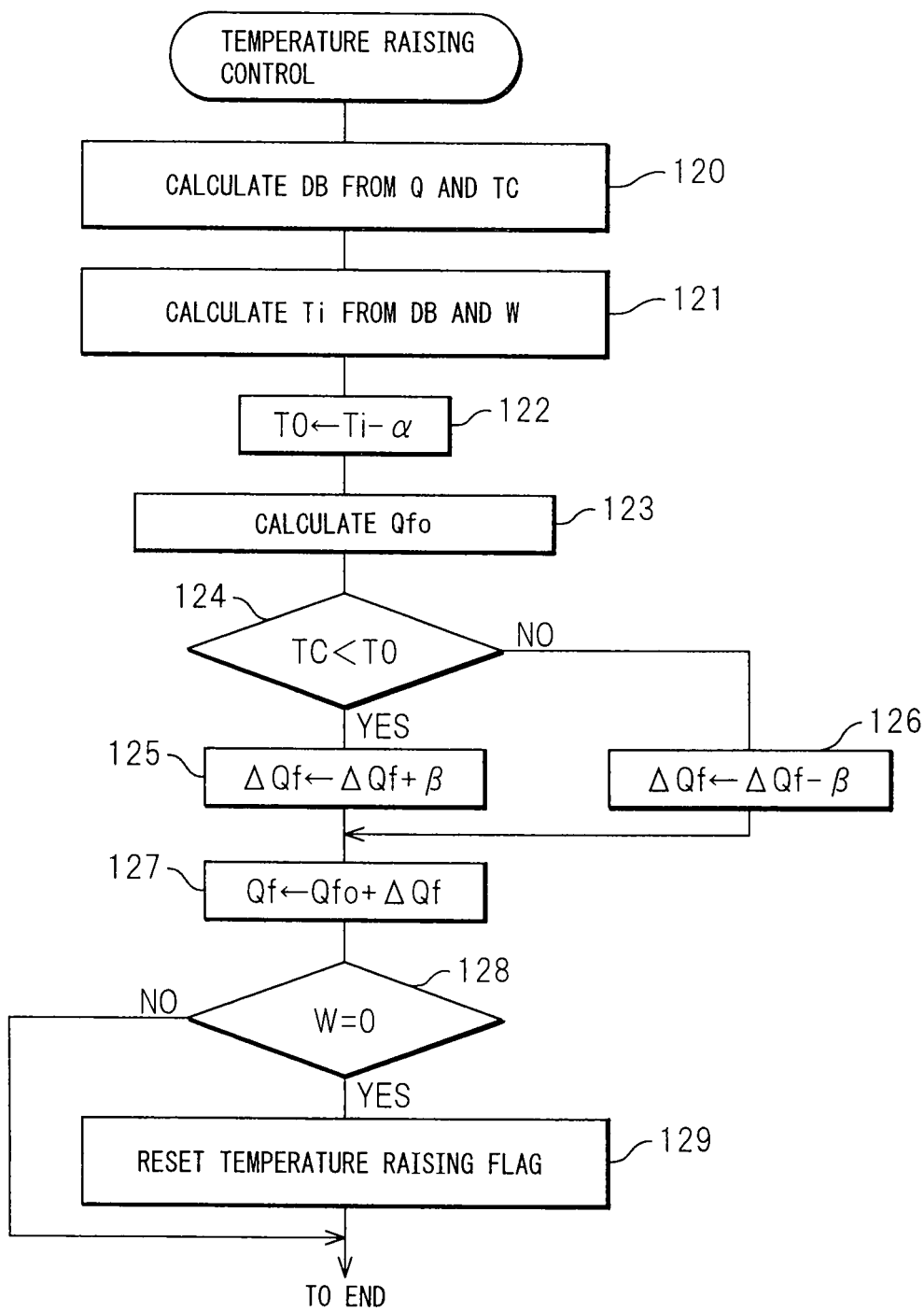
FIG. 7 is a flow chart for temperature raising control.

FIG. 6 and FIG. 7 show a routine for executing exhaust purification processing including the temperature raising control shown in FIG. 5. This routine is executed by interruption every certain time interval.

Figure 4:
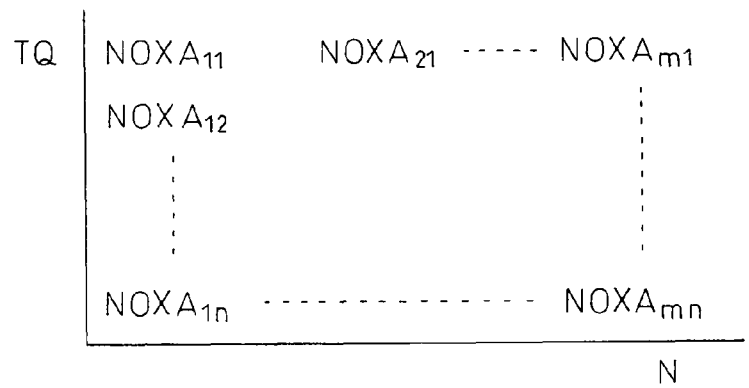
FIG. 4 is a view showing a map of an exhaust $NO_x$ amount NOXA.

Referring to FIG. 6, first, at step 100, the amount NOXA of NO$_x$ exhausted from the engine per unit time is calculated. This exhausted NO$_x$ amount NOXA is stored as a function of the required torque TQ and engine speed N in the form of a map shown in FIG. 4 in advance in the ROM 32. At the next step 101, the NO$_x$ adsorption rate RA is calculated from the relationship shown in FIG. 3, while at the next step 102, the NO$_x$ desorption rate DA is calculated from the relationship shown in FIG. 5.

At the next step 103, the NO$_x$ adsorption amount W of NO$_x$ adsorbed at the NO$_x$ adsorption catalyst 12 is calculated based on the following formula:

$$W \leftarrow W + NOXA \cdot RA - DA$$

That is, the amount of adsorption of NO$_x$ at the NO$_x$ adsorption catalyst 12 per unit time becomes NOXA·RA and the amount of desorption of NO$_x$ from the NO$_x$ adsorption catalyst 12 is DA, so the NO$_x$ adsorption amount W at the NO$_x$ adsorption catalyst 12 is expressed by the above formula.

At the next step 104, the NO$_x$ storage rate RRB is calculated from the relationship shown in FIG. 3, while at the next step 105, the NO$_x$ storage amount Q stored at the NO$_x$ storage catalyst 14 is calculated by the following formula:

$$Q \leftarrow Q + [NOXA \cdot (1-RA) + DA] \cdot RB$$

That is, the amount of NO$_x$ passing through the NO$_x$ adsorption catalyst 12 per unit time is NOXA·(1−RA) and the amount of desorption of NO$_x$ desorbed from the NO$_x$ adsorption catalyst 12 per unit time is DA, so the amount of NO$_x$ stored in the NO$_x$ storage catalyst 14 per unit time becomes [NOXA·(1−RA)+DA]·RB. Therefore, the NO$_x$ storage amount Q to the NO$_x$ storage catalyst 14 is expressed by the above formula.

At the next step 106, it is determined if a temperature raising flag showing that temperature raising control for making the NO$_x$ adsorption catalyst 12 desorb the NO$_x$ should be executed is set. When the temperature raising flag is not set, the routine proceeds to step 107 where it is determined if the NO$_x$ adsorption amount W is smaller than a predetermined lower limit MIN. When the NO$_x$ adsorption amount W is small and W<MIN, it is meaningless even if temperature raising control is performed, so the routine jumps to step 110.

At step 110, rich control is performed to temporarily make the air-fuel ratio of the exhaust gas flowing into the $NO_x$ storage catalyst 14 rich so as to make the $NO_x$ storage catalyst 14 release the $NO_x$. This rich control is performed when the $NO_x$ storage amount Q exceeds a predetermined allowable value and the $NO_x$ storage catalyst 14 is sufficiently activated. When this rich control is performed, the $NO_x$ storage amount Q is made zero.

On the other hand, when it is determined at step 107 that W≧MIN, the routine proceeds to step 108 where it is determined if the $NO_x$ storage rate DB determined from the $NO_x$ storage amount Q and the temperature TC of the $NO_x$ storage catalyst 14 has exceeded the predetermined $NO_x$ storage rate $DB_0$ shown in FIG. 5. When DB>$DB_0$, the routine proceeds to step 111 where the temperature raising flag is set, then at the next step 112, temperature raising control is performed. If the temperature raising flag is set, after that, the routine jumps from step 1006 to step 112.

On the other hand, when it is determined at step 108 that DB≦$DB_0$, the routine proceeds to step 109 where it is determined if the $NO_x$ adsorption amount W has exceeded an allowable maximum limit value MAX. When it is determined that W>MAX, the routine proceeds to step 111 where the temperature raising flag is set. That is, when the $NO_x$ adsorption amount W approaches the saturated adsorption amount, temperature raising control is started even when the $NO_x$) storage rate DB is low.

The temperature raising control at step 112 is shown in FIG. 7. Referring to FIG. 7, at step 120, the $NO_x$ storage rate DB is calculated from the $NO_x$ storage amount Q and the temperature TC of the $NO_x$ storage catalyst 14. At the next step 121, the catalyst temperatures Ti represented by $T_1$, $T_2$, $T_3$, and $T_4$ in FIG. 5 are calculated from the $NO_x$ storage rate DB and the $NO_x$ adsorption amount W. At the next step 122, a small fixed value α is subtracted from the catalyst temperature Ti to calculate the target temperature TO. At the next step 123, the basic injection amount $Qf_0$ of the additional fuel injected into the combustion chamber 2 at the time of the expansion stroke for example for raising the temperature of the $NO_x$ adsorption catalyst 12 is calculated. This basic injection amount $Qf_0$ is stored as a function of the temperature difference of the current temperature TC of the $NO_x$ adsorption catalyst 12 and the target temperature TC in advance in the ROM 32.

At the next step 124, it is determined if the temperature TC of the $NO_x$ adsorption catalyst 12 is lower than the target temperature TO. When TC<TO, the routine proceeds to step 125 where a fixed amount β is added to the correction amount ΔQf for the basic injection amount $Qf_0$, then the routine proceeds to the next step 127. As opposed to this, when TC≧TO, the routine proceeds to step 126 where the fixed value β is subtracted from the correction amount ΔQf, then the routine proceeds to the next step 127. At the step 127, the correction amount ΔQf is added to the basic injection amount $Qf_0$ so as to calculate the final injection amount Qf of the additional fuel. This injection amount Qf is used for the action of injection of the additional fuel. At the next step 128, it is determined if the $NO_x$ adsorption amount W has become zero. When it is determined that W=0, the routine proceeds to step 129 where the temperature raising flag is reset.

Figure 8:
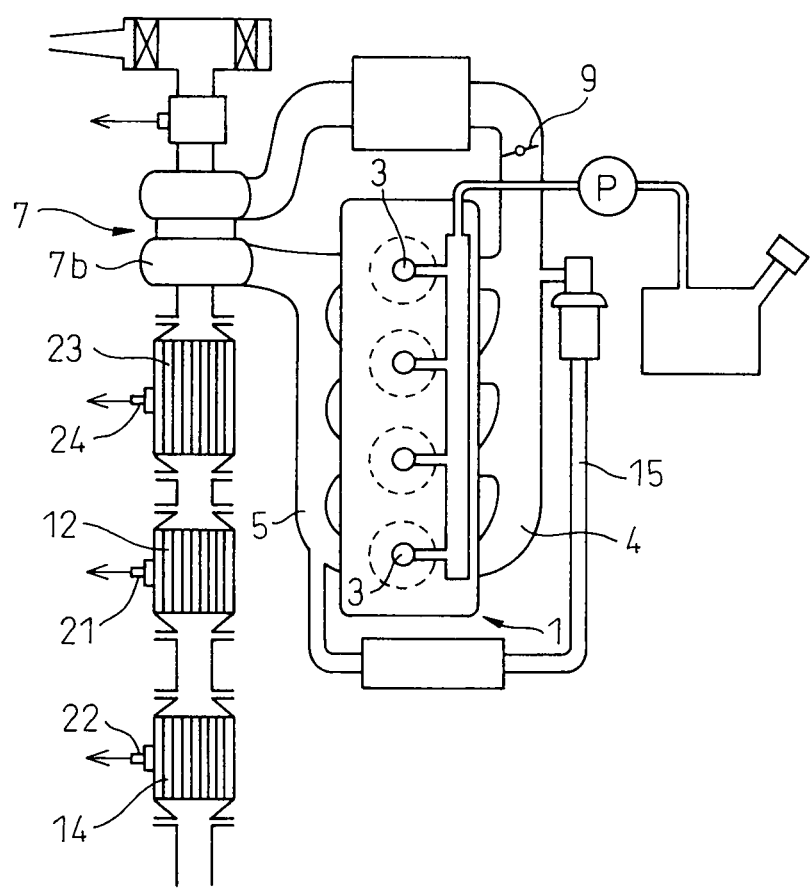
FIG. 8 is an overview of another embodiment of a compression ignition type internal combustion engine.

FIG. 8 shows another embodiment.

In this embodiment, upstream of the $NO_x$ adsorption catalyst 12 in the engine exhaust passage, an $SO_x$ trap catalyst 23 able to trap $SO_x$ contained in the exhaust gas is arranged. This $SO_x$ trap catalyst 23 has attached to it a temperature sensor 24 for detecting the temperature of the $SO_x$ trap catalyst 23.

That is, exhaust gas contains $SO_x$. When this $SO_x$ is adsorbed at the $NO_x$ adsorption catalyst 12, the $NO_x$ adsorption catalyst 12 falls in $NO_x$ adsorption ability. Therefore, in this embodiment, to prevent the $SO_x$ from flowing into the $NO_x$ adsorption catalyst 12, an $SO_x$ trap catalyst 23 is arranged upstream of the $NO_x$ adsorption catalyst 12. This $SO_x$ trap catalyst 23 usually continues to trap $SO_x$. $SO_x$ is never released from the $SO_x$ trap catalyst 23.

However, when the temperature TS of the $SO_x$ trap catalyst 23 rises, $SO_x$ is released from the $SO_x$ trap catalyst 23. The catalyst temperature TSOX where $SO_x$ is released in this way, while differing depending on the type of the $SO_x$ trap catalyst 23, is usually 500° C. or more. In this regard, when making the $NO_x$ adsorption catalyst 12 desorb $NO_x$ by raising the temperature of the exhaust gas temperature and thereby raising the temperature of the $NO_x$ adsorption catalyst 12, the $SO_x$ trap catalyst 23 is also simultaneously raised in temperature.

Therefore, in this case, when the temperature TC of the $NO_x$ adsorption catalyst 12 is made to rise toward the target temperature TO, if the temperature TS of the $SO_x$ trap catalyst 23 becomes higher than the temperature TSOX at which the $SO_x$ is released, $SO_x$ is released from the $SO_x$ trap catalyst 23. Therefore, in this embodiment, the target temperature TO is determined so that the temperature TS of the $SO_x$ trap catalyst 23 becomes less than the temperature TSOX at which the $SO_x$ is released when the exhaust gas temperature is made to rise so that the $NO_x$ adsorption catalyst 12 desorbs $NO_x$.

Figure 9:
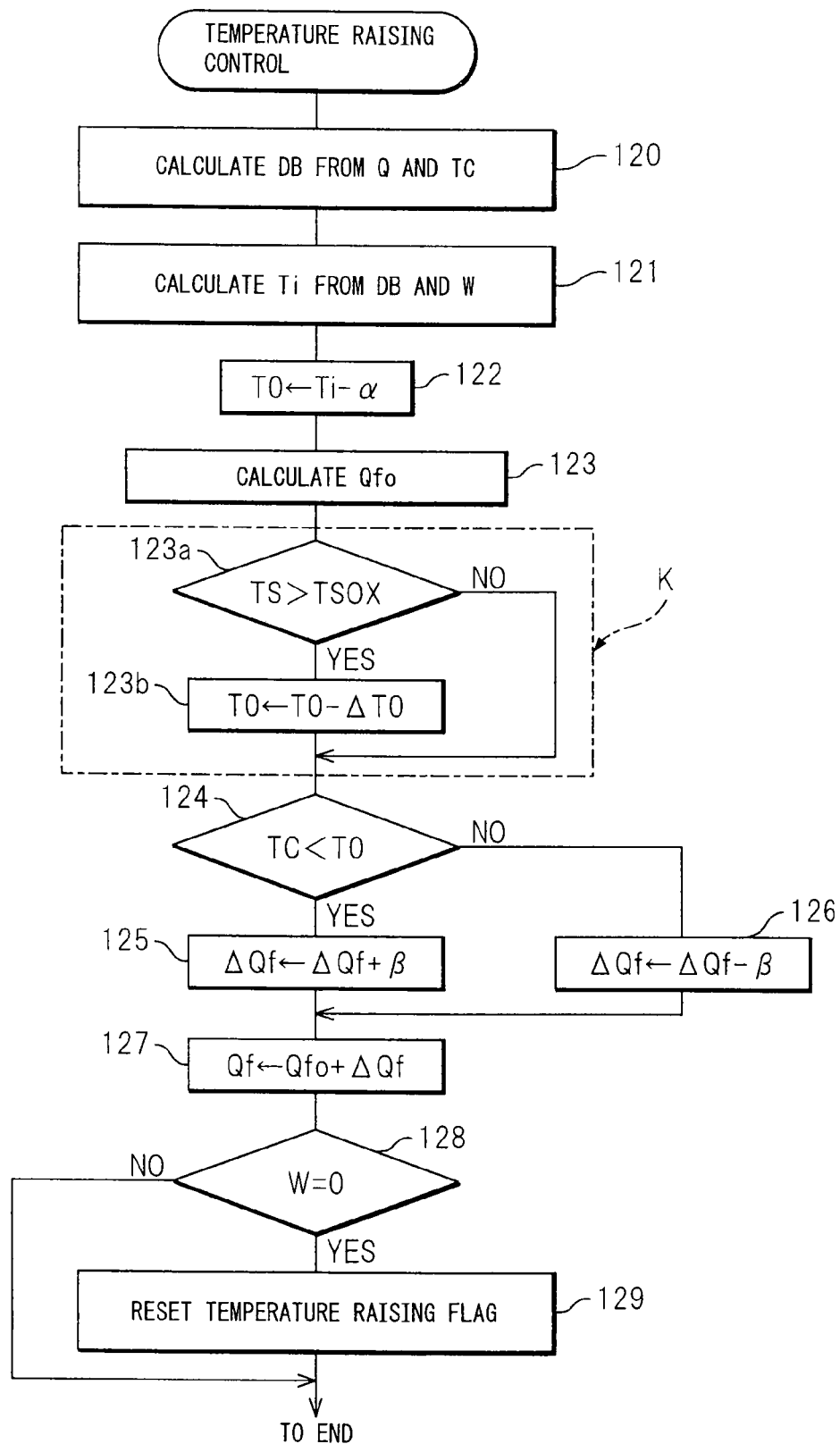
FIG. 9 is a flow chart of temperature raising control.

FIG. 9 shows a temperature raising control routine for working this embodiment. This routine just has the part K surrounded by the broken lines added between steps 123 and 124 of the routine shown in FIG. 7. Aside from this part K, the routine is the same as that shown in FIG. 7, so only the part K surrounded by the broken line will be explained below. Referring to the part K surrounded by the broken line, at step 123a, it is determined if the temperature TS of the $SO_x$ trap catalyst 23 is higher than the temperature TSOX at which $SO_x$ is released. When TS≦TSOX, the routine proceeds to step 124. As opposed to this, when TS>TSOX, the routine proceeds to step 123b where the target temperature TO is reduced by exactly a predetermined temperature ΔTO so that TS<TSOX.

REFERENCE SIGNS LIST

4 . . . intake manifold
5 . . . exhaust manifold
7 . . . exhaust turbocharger
12 . . . $NO_x$ adsorption catalyst
14 . . . $NO_x$ storage catalyst

The invention claimed is:

1. An exhaust purification device of an internal combustion engine, comprising:
   an NOx storage catalyst disposed in an engine exhaust passage, the NOx storage catalyst storing NOx contained in an exhaust gas when an air-fuel ratio of an inflowing exhaust gas is lean and releasing stored NOx when the air-fuel ratio of the inflowing exhaust gas becomes the stoichiometric air-fuel ratio or rich;
   an NOx adsorption catalyst disposed upstream of the NOx storage catalyst in the engine exhaust passage that adsorbs NOx contained in the exhaust gas when the NOx adsorption catalyst is at a low temperature and that desorbs adsorbed NOx when the temperature of the NOx adsorption catalyst rises; and
   an electronic control unit (ECU) programmed to execute control of the exhaust purification device such that when the NOx storage catalyst is active and able to store NOx, the ECU executes programmed instructions to control a temperature of the NOx adsorption catalyst such that the temperature of the NOx adsorption catalyst is forcibly made to rise to a target temperature at which an amount of NOx which the NOx storage catalyst can store is desorbed, and the NOx desorbed from the NOx adsorption catalyst is made to be stored in the NOx storage catalyst.

2. The exhaust purification device of an internal combustion engine as claimed in claim 1, wherein said target temperature is made a temperature where an NOx desorption rate from the NOx adsorption catalyst becomes less than an NOx storage rate to the NOx storage catalyst.

3. The exhaust purification device of an internal combustion engine as claimed in claim 2, wherein said NOx desorption rate from the NOx adsorption catalyst is stored in advance as a function of an NOx adsorption amount adsorbed at the NOx adsorption catalyst and the temperature of the NOx adsorption catalyst,
wherein said NOx storage rate at the NOx storage catalyst is stored in advance as a function of an NOx storage amount stored at the NOx storage catalyst and the temperature of the NOx storage catalyst, and
wherein said target temperature is determined based on the NOx adsorption amount adsorbed at the NOx adsorption catalyst, the NOx storage amount stored at the NOx storage catalyst, and the temperature of the NOx storage catalyst.

4. The exhaust purification device of an internal combustion engine as claimed in claim 2, wherein said target temperature is repeatedly updated during an action of desorption of NOx from the NOx adsorption catalyst.

5. The exhaust purification device of an internal combustion engine as claimed in claim 1, further comprising an SOx trap catalyst disposed upstream of said NOx adsorption catalyst in the engine exhaust passage, the SOx trap catalyst trapping SOx contained in exhaust gas, and
wherein when NOx should be desorbed from the NOx adsorption catalyst, the ECU executes programmed instructions to control a temperature of the exhaust gas flowing into the SOx trap catalyst such that the temperature of the exhaust gas flowing into the SOx trap catalyst is raised so as to raise the temperature of the NOx adsorption catalyst, and at this time, the target temperature is determined so that a temperature of the SOx trap catalyst becomes less than a temperature where SOx is released.

6. The exhaust purification device of an internal combustion engine as claimed in claim 1, further comprising a fuel injector,
wherein an additional fuel amount is injected via the fuel injector into a combustion chamber at a time of an expansion stroke to raise the temperature of the NOx adsorption catalyst.

7. The exhaust purification device of an internal combustion engine as claimed in claim 1, further comprising a temperature sensor that detects the temperature of the NOx adsorption catalyst.

8. The exhaust purification device of an internal combustion engine as claimed in claim 1, wherein the ECU executes programmed instructions to determine whether to execute temperature raising control for making the NOx adsorption catalyst desorb the NOx.

* * * * *